US010343081B2

(12) United States Patent
Porta (10) Patent No.: US 10,343,081 B2
(45) Date of Patent: Jul. 9, 2019

(54) GRAIN ALCOHOL DISTILLATION PLANTS (71) Applicant: Porta Hnos. S.A., Córdoba (AR)

(72) Inventor: Jose Vicente Ramon Porta, Provincia de Córdoba (AR)

(73) Assignee: PORTA Hnos S.A., Cordova (AR)

( * ) Notice: Subject to any disclaimer, the term of this patent is extended or adjusted under 35 U.S.C. 154(b) by 163 days.

(21) Appl. No.: 15/464,626

(22) Filed: Mar. 21, 2017

(65) Prior Publication Data
US 2017/0266582 A1   Sep. 21, 2017

(51) Int. Cl.
*B01D 3/42* (2006.01)
*B01D 3/00* (2006.01)
*B01D 1/10* (2006.01)
*B01D 1/08* (2006.01)
*B01D 3/14* (2006.01)
*B01D 5/00* (2006.01)
*B01D 3/32* (2006.01)

(52) U.S. Cl.
CPC ............ *B01D 3/001* (2013.01); *B01D 1/08* (2013.01); *B01D 1/10* (2013.01); *B01D 3/002* (2013.01); *B01D 3/14* (2013.01); *B01D 3/326* (2013.01); *B01D 3/42* (2013.01); *B01D 5/003* (2013.01); *B01D 5/006* (2013.01); *B01D 5/0012* (2013.01); *B01D 5/0063* (2013.01); *Y02E 50/17* (2013.01)

(58) Field of Classification Search
CPC . B01D 3/001; B01D 3/14; B01D 3/42; C12G 3/12; C12F 3/10
See application file for complete search history.

(56) References Cited

U.S. PATENT DOCUMENTS

| 1,744,504 A | * | 1/1930 | Ricard | C07C 29/76 203/19 |
| 1,937,786 A | * | 12/1933 | Ricard | B01D 1/26 203/19 |
| 1,940,699 A | * | 12/1933 | Ricard | B01D 3/22 202/154 |

(Continued)

*Primary Examiner* — Jonathan Miller
(74) *Attorney, Agent, or Firm* — Defillo & Associates; Evelyn Defillo (57) ABSTRACT

Improvements in grain alcohol distillation plants by incorporating a novel internal arrangement in the wort column and the rectifying column with distributors and accumulators inside thereof, achieving a stable and safe process in wide ranges of operation, guaranteeing the productivity of the plant and the quality of the products. The wort column features detachable perforated plates, easy to access and clean through manholes. By having easily detachable plates and, also, a manhole for each plate with "holder" type connections, the access to the interior of the column for cleaning and maintenance purposes is facilitated. The rectifying column is a special filling column with flow distributors, it has an intermediate alcohol accumulator and a condenser which is an integral part of the column that prevents the use of pumps. The arrangement of distributors and accumulators within the rectifying column favors the operational stability of the plant, allowing a low scale equipment to work similarly to an industrial scale column. The improvements include an integrated automation system with Internet communication for self-management of the plant with remote monitoring and autonomous operation.

8 Claims, 6 Drawing Sheets

(56) References Cited

U.S. PATENT DOCUMENTS

| | | | | |
|---|---|---|---|---|
| 1,973,529 A * | 9/1934 | Guinot | C12F 3/00 | 203/52 |
| 2,903,251 A * | 9/1959 | Thrift | B01D 3/163 | 261/114.1 |
| 2,963,423 A * | 12/1960 | Birchfield | C10G 7/00 | 208/251 R |
| 3,811,843 A * | 5/1974 | Morfit | B01D 11/0434 | 196/14.52 |
| 3,846,249 A * | 11/1974 | Merriman | A23B 4/02 | 196/111 |
| 4,217,178 A * | 8/1980 | Katzen | B01D 3/005 | 203/19 |
| 4,256,541 A * | 3/1981 | Muller | C07C 29/80 | 203/19 |
| 4,303,479 A * | 12/1981 | Church | B01D 3/24 | 159/13.4 |
| 4,308,109 A * | 12/1981 | Griffiths | B01D 3/146 | 203/37 |
| 4,328,074 A * | 5/1982 | Standiford | B01D 1/12 | 159/24.3 |
| 4,504,426 A * | 3/1985 | Chuang | B01D 3/22 | 202/158 |
| 4,568,356 A * | 2/1986 | Chambers | C07C 29/82 | 203/18 |
| 4,894,145 A * | 1/1990 | Jensen | B01D 3/4244 | 202/160 |
| 5,106,544 A * | 4/1992 | Lee | B01D 3/16 | 261/79.2 |
| 5,389,343 A * | 2/1995 | Gentry | B01D 3/009 | 203/DIG. 6 |
| 5,895,608 A * | 4/1999 | Lee | B01J 19/32 | 261/114.1 |
| 6,095,504 A * | 8/2000 | Heldwein | B01D 3/326 | 202/158 |
| 6,875,406 B1 * | 4/2005 | Hubinger | B01D 3/22 | 422/144 |
| 7,078,002 B2 * | 7/2006 | Van Vliet | B01F 3/04496 | 366/341 |
| 7,238,773 B2 * | 7/2007 | Huebinger | B01D 3/22 | 202/158 |
| 7,267,746 B1 * | 9/2007 | Harris | B01D 3/141 | 196/111 |
| 7,297,236 B1 * | 11/2007 | Vander Griend | B01D 3/005 | 202/153 |
| 7,867,365 B2 * | 1/2011 | Brown | B01D 3/002 | 159/2.1 |
| 8,101,808 B2 * | 1/2012 | Evanko | C07C 29/80 | 568/916 |
| 2007/0262022 A1 * | 11/2007 | Mosler | B01D 3/008 | 210/659 |
| 2008/0277260 A1 * | 11/2008 | Binkley | B01D 3/163 | 202/160 |
| 2009/0321057 A1 * | 12/2009 | Daly | B01D 5/0012 | 165/111 |
| 2010/0288624 A1 * | 11/2010 | Kim | B01D 3/324 | 203/87 |

* cited by examiner

GRAIN ALCOHOL DISTILLATION PLANTS

FIELD OF THE INVENTION

The present invention refers to improvements in grain alcohol distillation plants, and more particularly the invention refers to small grain ethanol production plants intended to be installed in agricultural establishments which can produce hydrated, anhydrous or high quality (potable) alcohol from different grains like corn, sorghum, rice, etc. By-products derived from the production of alcohol are, for example, moist distilled grains known as wet distillers grains, with high protein value, and a liquid food with high nutritional value as a source of energy. Wet distillers grains may at the same time undergo a drying process by the optional incorporation of a drying module in the plant, hereinafter referred to as "minidest". In addition, it should be mentioned that the distillation plant with the improvements according to the present invention may be coupled to a biogas production plant which reuses the liquid feed stream in the generation thereof and, thus, the production is energy self-sustaining, creating genuine, clean and renewable energy.

DIFFERENCES OF THE INVENTION IN RESPECT OF THE STATE OF THE ART

The present invention provides a novel internal arrangement of the wort column and the rectifying column with distributors and accumulators therein, achieving a stable and safe process in wide ranges of operation, guaranteeing plant productivity and products quality. Among the main differences of these columns with respect to conventional plants, the following ones should be mentioned:

The wort column of the present invention uses detachable perforated plates, which are easy to access and clean, whereas in conventional columns, plates are fixed and generally perforated plates are not used for wort. That is to say, by having easily detachable plates and manholes formed by each plate with "holder" type connections, access to the interior of the column for cleaning and maintenance purposes is facilitated. Thus, if there is an obstruction in the equipment, it can be easily operated by accessing through the manholes, which means that the downtime and cleaning time is less than 60 minutes. The plates can also be constructed with a detachable joint arrangement which would facilitate a major procedure. One or both arrangements can be chosen. Furthermore, a design of perforated plates specially designed provides an equipment of simple construction, low cost and with the robustness necessary for a continuous operation.

The rectifying column is a special filling column with flow distributors specifically designed for this operation. It has an intermediate alcohol accumulator and a condenser which is an integral part of the column that avoids the use of pumps. In contrast, traditional columns use plates but do not have distributors or accumulators, and do not have an integrated condenser. In addition the bottom acts as condenser of the wort column. The non-use of pumps has the advantage of requiring less installed power, less complexity of the automation, lower installation cost and less complexity in its operation.

Further advantages obtained from the improvements in the columns arrangement of the present invention with respect to conventional industrial plants are the following:

No evaporation or reuse of water is needed, therefore all this stage is unnecessary in the plant.

The grinding system is compact and is practically an integral part of a single equipment.

As the distillery of the minidest is a simplified model of only two columns with the particularities already mentioned, they provide simplicity and robustness.

It considerably simplifies piping installations.

Furthermore, the main advantages of this minidest plant, achieved as result of the improvements introduced with respect to conventional large-scale production plants are as follows:

Logistic costs associated with production are reduced to a minimum, since corn is processed at the place of origin and the food produced is consumed in situ (it can also be dried and stored). The only product to be moved is alcohol, generating savings of 80% in freight (one truck of alcohol per 5 of corn/by-products) compared with conventional plants.

Energy costs of ethanol production are reduced. The evaporation process is not necessary in this plant due to the proximity of the point of consumption. In traditional industrial plants, the liquid food (vinasse) is evaporated, concentrating it in solids, so that it can be mixed with the WDG thus forming the WDGS (initials in English for wet distillers grains), which is marketed as wet protein food (Burlanda/Distiller grains). In the minidest the evaporation process is not used because the liquid food can take two paths: Liquid food for animals or substrate for the generation of biogas.

Creation of value at the point of origin, improving the competitiveness of the sector, and the consequent generation of jobs in the fields.

Generation at the place of origin of a food of high protein value for the bovine/ovine/poultry diet, achieving a reduction in the feed cost of the animals.

It offers the producer a profitable alternative for the production of corn, avoiding monoculture, thus improving the structure and sustainability of the soil.

It does not use fossil fuels.

In the case of incorporating the drying module, it generates an exportable surplus of greater value than the unprocessed grain because of its high protein content.

It ensures that the water and minerals of the soil do not go with the grain, but return to the same field from where the grains were harvested.

It fulfills an important social purpose, since it enables to have a fuel of low cost and electric power in the places where gas/electricity is not available.

Enables energy self-sufficiency by incorporating a biogas module.

It should be noted that the arrangement of distributors and accumulators within the rectifying column favors the operational stability of the plant, allowing a low-scale equipment to work similarly to an industrial scale column.

SUMMARY OF THE INVENTION

The object of the present invention is to provide improvements in grain alcohol distillation plants by incorporating a novel internal arrangement of the wort column and the rectifying column with distributors and accumulators within the column, achieving a stable and safe process in wide ranges of operation, guaranteeing the productivity of the plant and the quality of the products. The wort column has detachable perforated plates, easy to access and clean through manholes. By having easily detachable plates and, also, a manhole for each plate with "holder" type connections, the access to the interior of the column for cleaning and maintenance purposes is facilitated. The rectifying column is a special filling column with flow distributors, has an intermediate alcohol accumulator and a condenser which is an integral part of the column that prevents the use of pumps.

The arrangement of distributors and accumulators within the rectifying column favors the operational stability of the plant, allowing a low scale equipment to work similarly to an industrial scale column. The improvements include an integrated automation system with Internet communication for self-management of the plant with remote monitoring and autonomous operation.

BRIEF DESCRIPTION OF THE DRAWINGS

For the sake of further clarity and understanding of the object of the present invention, it has been illustrated in figures which represent its preferred embodiment, wherein.

DETAILED DESCRIPTION OF THE INVENTION

Figure 1:
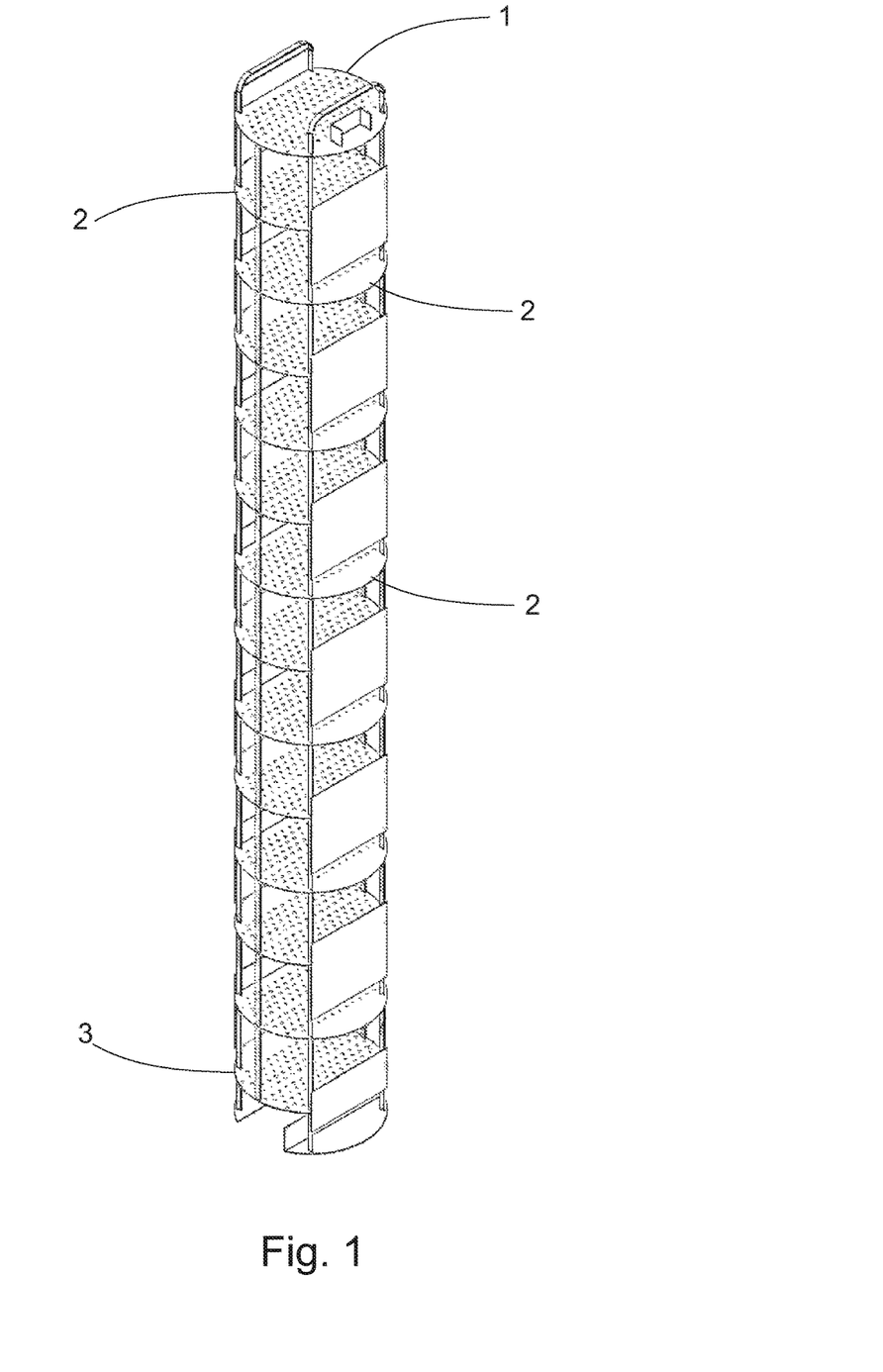
FIG. 1 is a perspective view of the set of perforated and detachable plates of the wort column according to the present invention.

FIG. 1 shows a wort column formed by a succession of perforated plates, detachable superimposed one on top of the other, comprising an upper plate 1, a plurality of intermediate plates 2, and a lower plate 3, which are housed in a tube (not shown) defining the housing of the section column according to the diameter of the set of plates to be housed. The plates are spaced from each other by means of respective vertical panels 4 defining perimeter support legs and, at the same time, are structural reinforcements which keep the succession of superimposed plates aligned. Each of said upper 1, intermediate 2 and lower 3 plates has a plurality of perforations 5, for example in an amount of 134 perforations per plate.

Figure 2A:
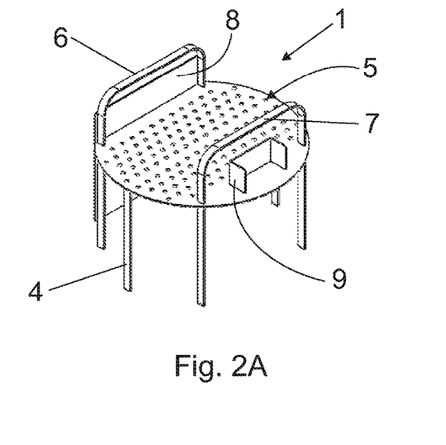
FIGS. 2A and 2B are perspective views of the upper plate structure of the wort column.
Figure 2B:
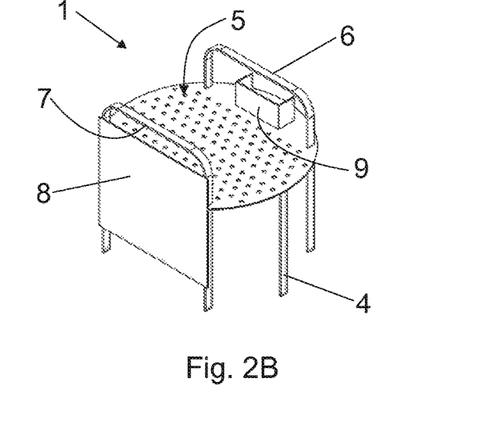

In FIGS. 2A and 2B it can be seen that the upper plate 1 has inverted "U" shaped supports 6 and 7, from which it is secured to proceed to the removal of the set of plates. The side arms of said supports 6 and 7 are aligned with the corresponding panels 4 in order to maintain the rigidity of the set of plates. Behind the support 6 there is, perpendicularly to the surface of the plate 1 and on a straight edge or cord of the circumference of said plate, a lateral panel defining a spillway 8, which extends to the surroundings of the lower ends of the pair of panels 4, and whose function is to be the hydraulic seal of the panel. Diametrically opposed the spillway 8, and below the fixing holder 7, the upper plate 1 includes a drawer 9 intended to define an anti-sweeping stop so that the liquid entering said plate does not sweep all the fluid.

Figure 3A:
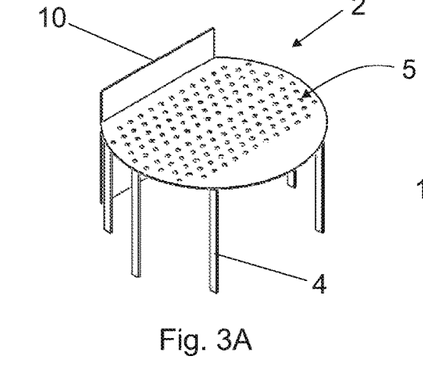
FIGS. 3A and 3B are perspective views of the structure of one of the intermediate plates of the wort column.
Figure 3B:
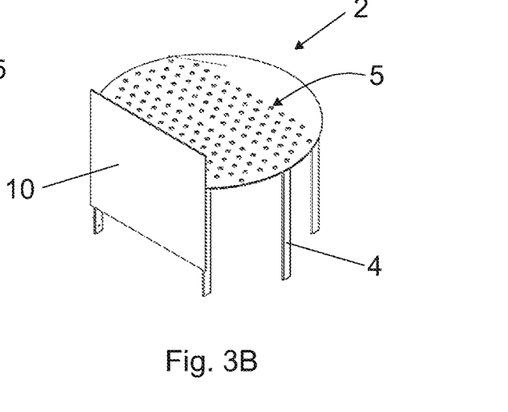

FIGS. 3A and 3B, which illustrate one of the intermediate plates 2, show that they have a spillway 10, arranged in an analogous form and aligned integrally with spillway 8 of the upper plate 1 to fulfill the hydraulic seal function of the plate.

Figure 4A:
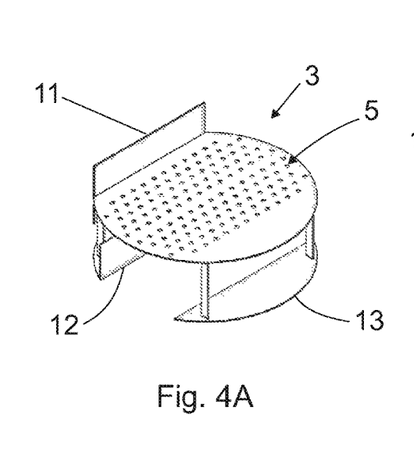
FIGS. 4A and 4B are perspective views of the structure of the lower plate of the wort column.
Figure 4B:
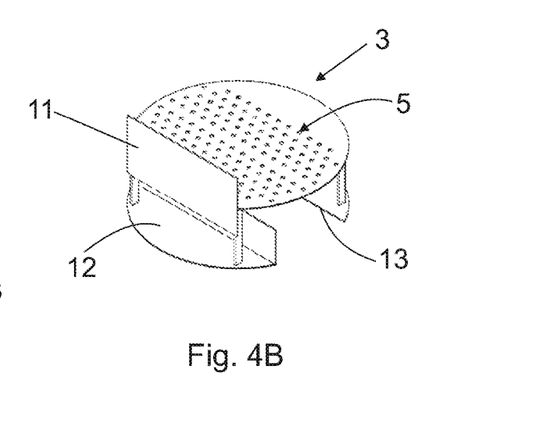
Figure 5:
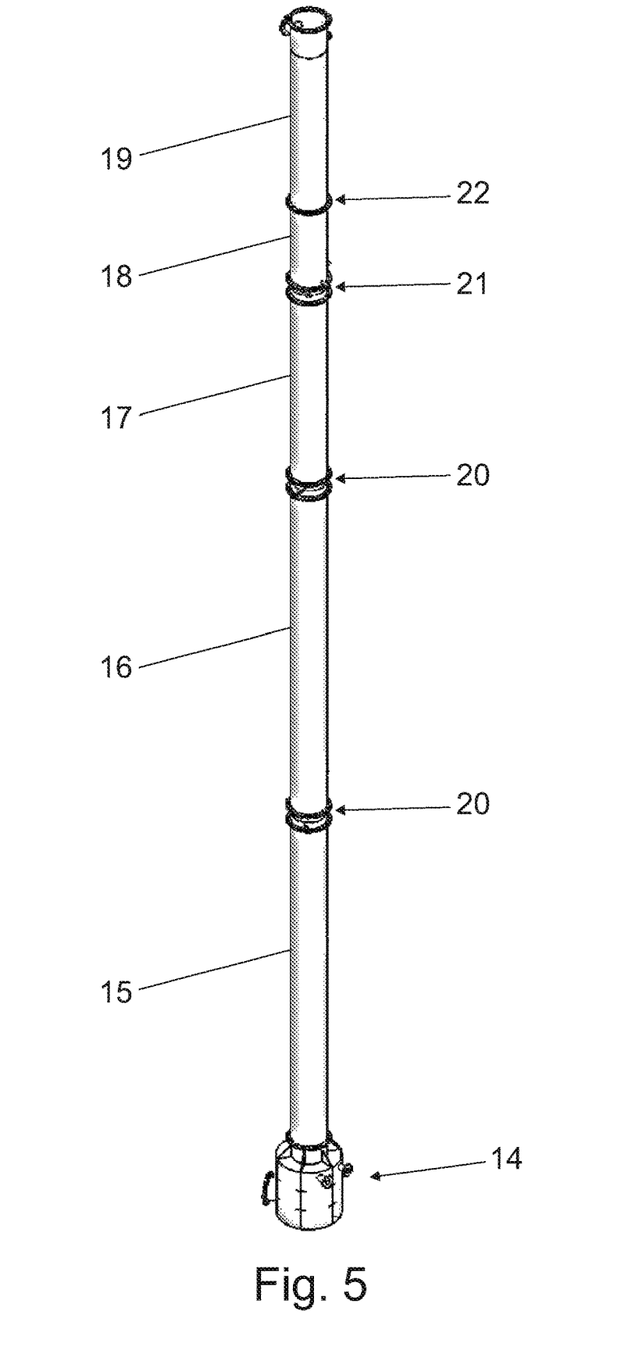
FIG. 5 is a perspective view of the rectifying column according to the present invention.

FIGS. 4A and 4B show that the lower plate 3 has a corresponding lateral spillway 11 fixed in an analogous manner and aligned with the spillway 10 of the intermediate plate (2) thereon, which also has the function of an hydraulic plate seal and consequently in this way the entire column of plates is kept hydraulically sealed. Below the lower plate 3 and the spillway 11 there is a surface panel 12 in the shape of a crescent and an "L" cross-section, which has the double function of final support to the set of plates and of the last seal in the column. On the other hand, and diametrically opposed to said panel 12, plate 3 has a flat panel 13, also with a crescent-shaped surface, which completes the lower support of the set of plates of the column.

Figures 6, 7, 8:
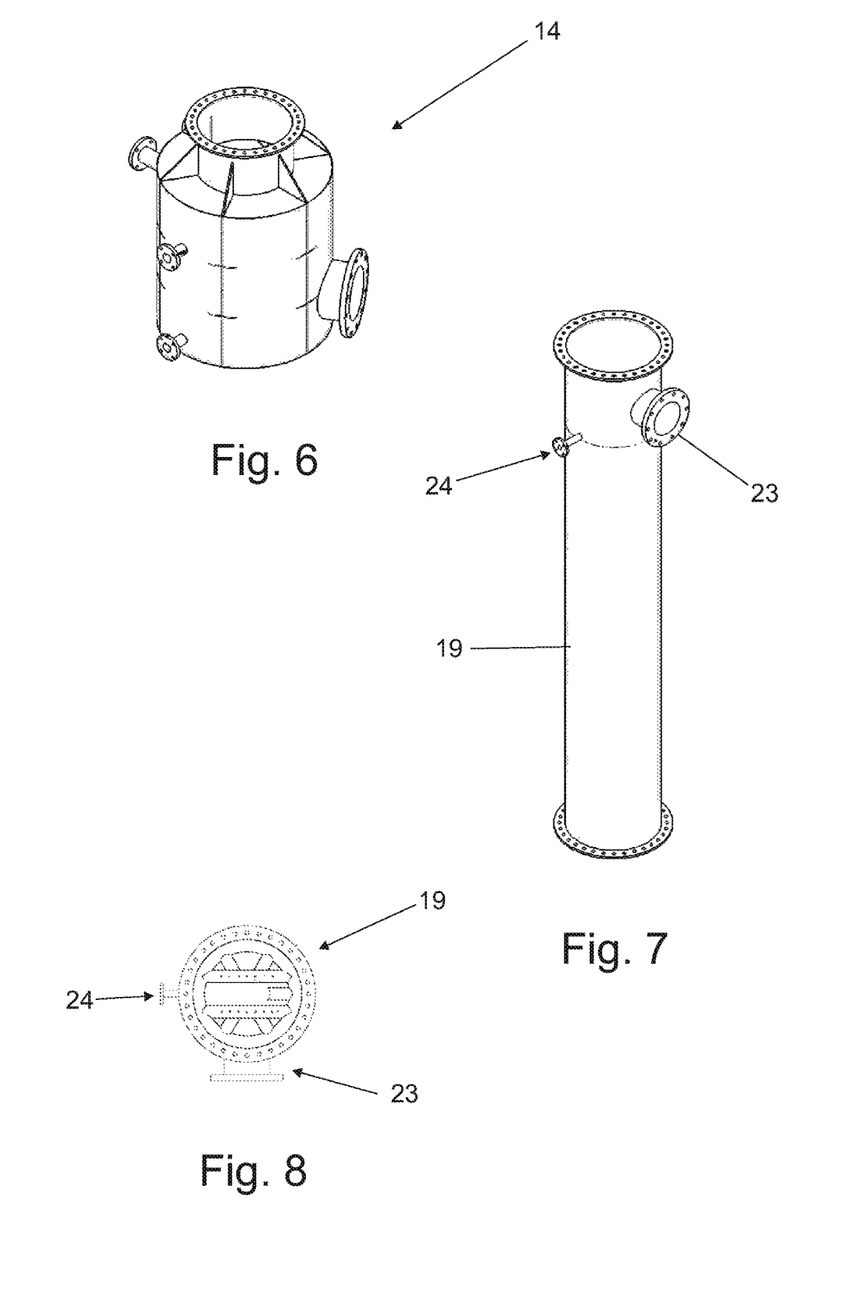
FIG. 6 is a perspective view of the base of the rectifying column shown in FIG. 5.
FIG. 7 is a perspective view of the upper filling section of the rectifying column shown in FIG. 5.
FIG. 8 is a cross-section of the upper filling section shown in FIG. 7, where the incorporation into said section of a distributor with liquid-inlet is observed.

FIGS. 5 to 8 show the structural features of the rectifying column, which comprises a base 14 with their corresponding connecting mouths, extending from said base 14 a first long filled section 15, then a second long filled section 16, then a short filled section 17, followed by an inner receiver 18, and finally an upper filled section 19. Sections 15, 16 and 17 are connected to each other by respective distributing sections 20 with closed perimeters. The upper end of the short filled section 17 is connected to the lower end of the inner receiver 18 by means of a distributing section 21 with fluid inlet, while the upper end of the said inner receiver 18 is attached to the lower end of the upper filled section 19 by means of respective flanges 22. FIG. 7 shows that the upper filled section 19 has a side connection 23, and in addition there is a connection 24 corresponding to the distributor with fluid inlet housed in said section 19. Said distributor is identical to the distributor Illustrated in detail in FIGS. 10A to 10C which will be described below.

Figure 9A:
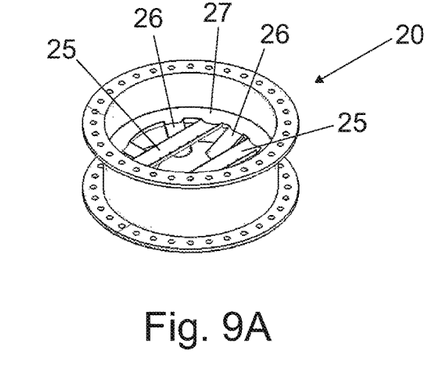
FIG. 9A is a perspective view of one of the flow distributing sections with closed perimeter of the rectifying column shown in FIG. 5.
Figure 9B:
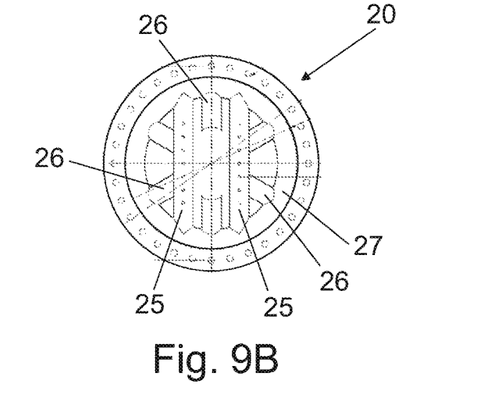
FIG. 9B is a top view of the flow distributing section shown in FIG. 9A.
Figure 9C:
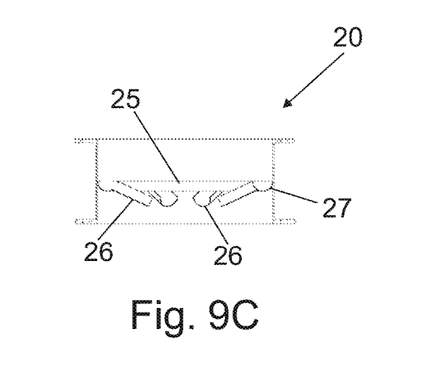
FIG. 9C is a cross-sectional view of the flow distributing section shown in FIG. 9A.

FIGS. 9A to 9C show in detail that the internal structure of the distribution sections 20 has transverse channels 25 and radial channels 26 connected to an annular manifold 27.

Figure 10A:
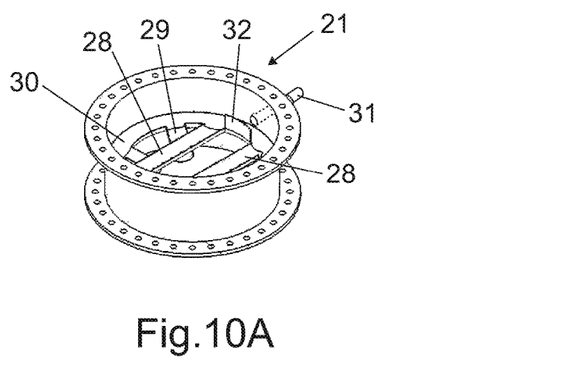
FIG. 10A is a perspective view of the flow distributing section with fluid inlet of the rectifying column shown in FIG. 5.
Figure 10B:
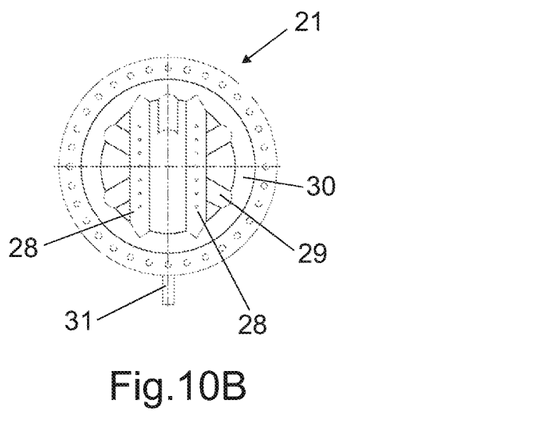
FIG. 10B is a top view of the flow distributing section with fluid inlet shown in FIG. 11.
Figure 10C:
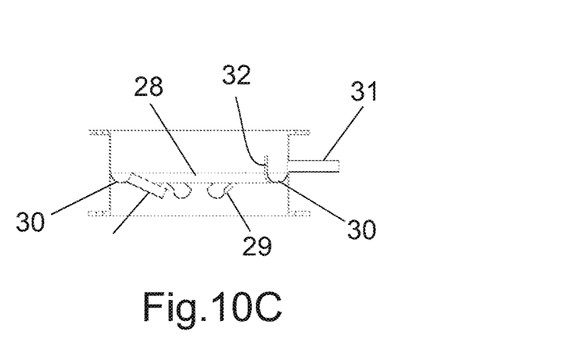
FIG. 10C is a cross-sectional view of the flow distributing section shown in FIG. 9A.

FIGS. 10A to 10C show in detail that the internal structure of the distribution section 21 has transverse liquid distribution channels 28 and radial channels 29 connected to an annular manifold 30. In the free space between the transverse channels 28, said distributor 21 has a conduit 31 followed, inside the distributor, a panel 32, facing said conduit 31, disposed at the inner edge of the manifold 30 and accompanying the curvature thereof.

Figures 11A, 11B, 12A, 12B:
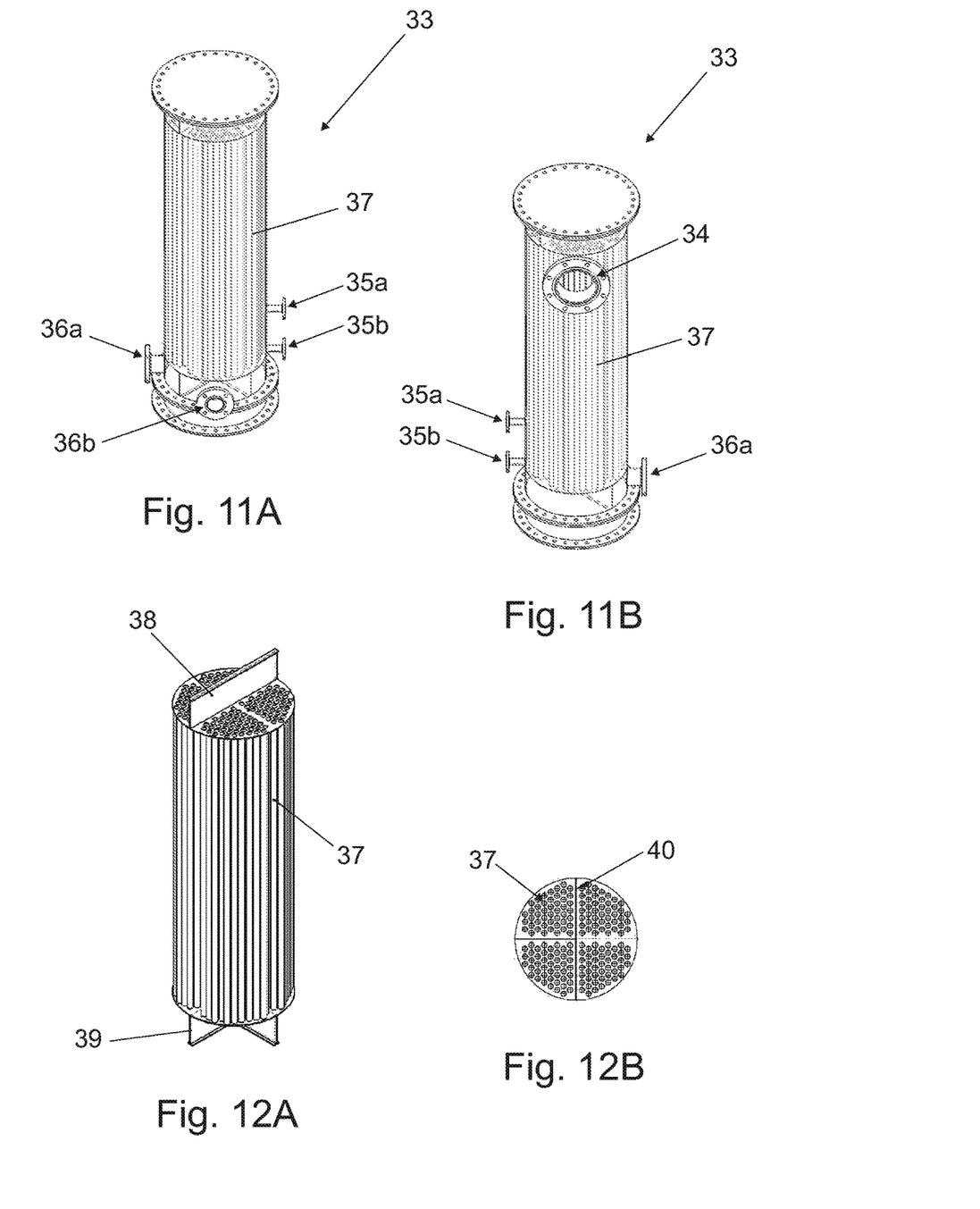
FIGS. 11A and 11B are perspective views of the condenser incorporated in the wort column illustrated in FIG. 1.
FIG. 12A is a perspective view of the tubes structure of the condenser shown in FIGS. 11A and 11B.
FIG. 12B is a cross-sectional view of the condenser shown in FIGS. 11A, 11B and 12A, where the distribution of tubes separated by vertical divisions can be seen.

FIGS. 11A and 11B show that the condenser 33, which is an integral part of the rectifying column, has an alcohol inlet 34 at its upper part, alcohol outlet ducts 35a and 35b at its lower part, below which it has cooling water inlet/outlet ports 36a and 36b, having said ports and said conduits the corresponding connecting flanges. These figures also illustrate, and more detailed in FIG. 12A, that the condenser is formed by a plurality of longitudinal tubes 37, having upper divisions 38 and lower divisions 39 disposed at the ends of the set of said tubes. 12B shows that the set of tubes 37 is also separated into groups by means of vertical divisions 40, forming a symmetrical arrangement of tubes in four quadrants.

The distillation plants with the improvements introduced as explained above, are 100% automated through an integrated management system with Internet communication, which allows the self-management of the plant with remote monitoring. The system has been developed to operate autonomously, ensuring the quality of the products obtained and the safety of the operation. All the plant automation is integrated in a PLC with SCADA system in a PC that allows its local and remote operation. In this way, it becomes an intelligent module that feeds back with the data it registers and interprets, automatically varying the "setup" of the plant to improve the operation.

The remote monitoring scheme of the plant allows a control center to control all plants, modify from there operational parameters and instruct field staff on the tasks to be performed, thus improving the efficiency of the operation and the use of resources. Field staff does not require much preparation as they only follow the instructions given by the system and the remote control center.

Further detailed:

All tasks necessary for the operation of the plant are automated.

The entire system is controlled by a PLC with interface through a SCADA system.

The system has several control loops. Basically they are flow rate/pressure /temperature/alcohol level/density/ PH/Level controls.

Basically a desired production rate is set up, the start order is given and the system takes control of the plant by adjusting the various variables until it reaches a fixed condition and maintains it. To achieve this in addition to the aforementioned loops, the system makes a series of comparisons and accounts vs. a database incorporated into the software that allows you to adjust the control loops according to the actual operating condition and even taking into account the atmospheric conditions that may cause variations in the system such as atmospheric pressure.

If any unbalance occurs in the normal scheme, the control system will try to compensate the situation to return to the normal scheme. If this cannot be achieved after a certain preset time, it will activate alarms indicating where the fault is. If the alarm is not answered after a time, it will switch to failure mode and the whole operation will stop in a programmed manner.

If you want to stop the operation, simply the stop mode is selected and the control system will stop the plant safely.

The control system also stores data and graphs the different variables. Graphs can be customized to compare interaction of different variables.

It allows remote connection via Internet (WI-FI, 3G, 4G, etc.) for monitoring and remote operation.

The plant shows a very high power integration where the operating system manages the Biogas generation module, thus ensuring the fuel needed for the boiler. The Biogas module is a two stage system. A first stage with enzymatic hydrolysis and a second stage of anaerobic reaction (of fixed bed or complete mixture). The facilities are designed to work with "hot" cooking or "cold" cooking of the wort. The fermentation is prepared to work in such a way that the whole process of mixing/cooking/fermentation is carried out within the same fermenter, or with the fermentation only mode, where the wort enters hydrolyzed to the fermenter.

The distillation plants with the improvements introduced as explained above, are 100% automated through an integrated management system with Internet communication, which allows self-management of the plant with remote monitoring. The system has been developed to operate autonomously, ensuring the quality of the products obtained and the safety of the operation. The whole plant automation is integrated in a PLC with SCADA system in a PC that allows its local and remote operation. In this way, it becomes an intelligent module that feeds back with the data it registers and interprets, automatically varying the "setup" of the plant to improve the operation.

The remote monitoring scheme of the plant allows a control center to control all plants, from there it is possible to modify operational parameters and instruct field staff on the tasks to be performed, thus improving the operation efficiency and use of resources. Field staff does not require much preparation as it just follows the instructions given by the system and the remote control center.

Having thus specially described and determined the nature of this invention, and the manner in which same may be put into practice, I do hereby claim as my own property and exclusive right.

The invention claimed is:

1. A grain alcohol distillation plant for production of grain ethanol, the plant comprising:
   a wort column; and
   a rectifying column;
      the wort column having;
         an upper plate (1)
         a plurality of intermediate plates(2) and
         a lower plate (3);
      wherein each one of the upper plate (1), the plurality of intermediate plates (2), and the lower plate (3) include a plurality of holes and the upper plate (1), the plurality of intermediate plates (2), and the lower plate (3) are separated by vertical panels (4);
      wherein the upper plate (1) includes:
         fixing holders (6,7), the fixing holders have a shape of an inverted "U", side arms of the fixing holders are aligned with the respective vertical panels (4) of the intermediate (2) and the lower (3) plates;
         a lateral panel located behind the fixing holder (6) of the upper plate (1) and perpendicular to a surface of the upper plate, the lateral panel defines a spillway (8) which extends to the surroundings of the lower ends of the corresponding pair of panels (4) and defines a hydraulic seal;
         a drawer (9) located diametrically opposed to said spillway (8) and below the fixing holder (7), the drawer serves as an anti-sweep stop for fluid entering said upper plate (1);
      wherein each one of the intermediate plates (2) includes;
         a spillway (10) aligned with the spillway (8) of the upper plate (1), the spillway forms hydraulic seals of said intermediate plates (2);

wherein the lower plate (3) has:
a lateral spillway (11) aligned with the spillway (10) of the intermediate plates (2) that are over the lower plate (3), the lateral spillway (10) defines a hydraulic seal for said lower plate (3);
a surface panel (12) located below the lower plate (13) and the lateral spillway (11), the surface panel;
a flat surface panel (13) located diametrically opposed to the surface panel (12), the flat surface (13) defines a lower support for the plates (1, 2, 3) and provides a seal of the columns:
the rectifying column having:
a base (14) with connecting pieces;
a first long filling section (15) extending from the base;
a second long filling section (16) connected to the first long filling section (15);
a short filling section (17) connected to the second long filling section (16),
a receiving section (18),
a top filling section (19),
a condenser (33) integrated into the rectifying column, the condenser includes an alcohol inlet port (34) located at an-upper part of the condenser (33), ducts (35a; 35b) located at a lower part of the condenser, cooling water inlet/ outlet ports (36a; 36b) located below the ducts (35a; 35b), said ports and said conduits having corresponding connecting flanges;
wherein the long filling sections and the short filling section (15; 16; 17) are connected to each other by respective flow distributors (20) with closed perimeter, and the upper end of the short filling section (17) is connected to the lower end of the inner receiver (18) by means of a flow distributing section (21) with fluid inlet; the rectifier column including an intermediate alcohol accumulator and a condenser integrated therewith.

2. The grain alcohol distillation plant according to claim 1, wherein the internal structure of the closed distribution sections (20) has transverse channels (25) and radial channels (26) connected to an annular manifold (27).

3. The grain alcohol distillation plant according to claim 1, wherein the condenser (33) is formed by a plurality of longitudinal tubes (37), upper divisions (38), and lower divisions (39) being arranged at the ends of the set of said tubes.

4. The grain alcohol distillation plant according to claim 3, wherein the set of tubes (37) is divided into groups by means of vertical divisions (40) forming a symmetrical arrangement of tubes into four quadrants.

5. The grain alcohol distillation plant according to claim 1, wherein the wort column includes manholes formed in accordance with each of said detachable perforated plates.

6. The grain alcohol distillation plant according to claim 1, wherein the distillation plant includes an integrated automation system with Internet communication for self-management of the plant with remote monitoring and autonomous operation.

7. The grain alcohol distillation plant according to claim 6, wherein the automation is integrated in a PLC with SCADA system in a PC for local and remote operation, thus defining an intelligent module that feeds back with a data that a PLC with SCADA system registers and interprets, automatically varying the "setup" of the plant to improve the operation.

8. A grain alcohol distillation plant for production of grain ethanol, the plant comprising:
a wort column having a successions of detachable superimposed perforated plates comprising:
an upper plate (1) with fixing holders (6,7),
a plurality of intermediate plates (2) and
a lower plate (3) with column supports;
a rectifying column having a base (14) with connection pieces from which a first and second long filling sections (15; 16) extend, a short filling section (17), a receiving section (18), and a top filling section (19), wherein long filling sections and the short filling section (15; 16; 17) are connected to each other by respective flow distributors (20) with closed perimeter, and the upper end of the short filling section (17) is connected to the lower end of the inner receiver (18) by means of a flow distributing section (21) with fluid inlet; the rectifier column including an intermediate alcohol accumulator and a condenser integrated therewith; wherein the internal structure of the distribution section with fluid inlet (21) has transverse fluid distribution channels (28) and radial channels (29) connected to an annular manifold (30), said fluid inlet (21) having in the free space between the transverse channels (28) a duct (31) and a panel (32) facing the duct arranged on the inner edge of the annular manifold (30).

* * * * *